United States Patent [19]
Ueno et al.
[11] Patent Number: 4,614,287
[45] Date of Patent: Sep. 30, 1986

[54] PIN TRACTOR

[75] Inventors: Toshihiko Ueno, Kobe; Sadao Tanimoto, Akashi, both of Japan

[73] Assignee: Bando Chemical Industries, Ltd., Kobe, Japan

[21] Appl. No.: 737,539

[22] Filed: May 24, 1985

[30] Foreign Application Priority Data

May 30, 1984 [JP] Japan ............................ 59-80081[U]
May 30, 1984 [JP] Japan ............................ 59-80082[U]
May 30, 1984 [JP] Japan ............................ 59-80083[U]
Apr. 22, 1985 [JP] Japan ............................ 60-60536[U]

[51] Int. Cl.⁴ ............................................ G03B 1/30
[52] U.S. Cl. .................................... 226/74; 400/616.1
[58] Field of Search .................. 226/74, 75, 6, 82, 87, 226/170, 171; 400/616.1, 616.2; 271/34

[56] References Cited

U.S. PATENT DOCUMENTS 4,079,633 3/1978 Cheema et al. ...................... 226/74
4,194,660 3/1980 Seitz .................................... 226/74
4,457,463 7/1984 Hubbard et al. ....................... 226/74

*Primary Examiner*—Leonard D. Christian
*Attorney, Agent, or Firm*—Auslander & Thomas

[57] ABSTRACT

Pin tractors which are used in various printers, typewriters, etc. for use as output devices for electronic computers, especially for personal computers. This pin tractor has a synthetic resin frame around which a belt carrying pins is wound revolvably and a presser member made of synthetic resin supported revolvably by said frame. Blank paper having feed perforations at its both edges is held between said frame and said presser member. Pins of said belt carrying pins are engaged with feed perforations of blank paper for feeding blank paper. Said presser member has pawl parts and said frame has concaves to correspond to said pawl parts. Said pawl parts are fitted in said concaves to keep said presser member opened in the specific degree.

6 Claims, 18 Drawing Figures

PIN TRACTOR

BACKGROUND OF THE INVENTION

1. Field of the Invention

This invention relates to a pin tractor for feeding blank paper for use in various printers, typewriters, etc., which are used as output devices for electronic computers, especially for personal computers.

2. Description of the Prior Art

In various printers, typewriters, etc. to be used as output devices for electronic computers, etc., pin tractors which feed blank paper by engaging pins of an endless belt carrying pins with feed perforations at both edges of blank paper and by running the endless belt carrying pins, are generally used. Such pin tractors, as disclosed by U.S. Pat. No. 4,214,691 for example, are so designed that a presser member to press blank paper being fed is supported revolvably on a frame by pins, and opening and closing of the presser member is controlled by a coil spring interposed between the presser member and the frame. In other words, the pressing member is forced into opening direction or closing direction with a change point as boundary by the coil spring.

Such pin tractors as stated above, however, require more parts, such as four pins, a coil spring, etc. to make the presser member revolvable and consequently are higher in manufacturing cost and poor in composability. Moreover, they have such disadvantage that while the presser member is pressing blank paper as it is in closed condition, spring force is the weakest but on the other hand, while the pressing member is in opened condition, spring force is the strongest. This means that when the change of blank paper is finished and the presser member is restored to its original condition (in closed condition), the presser member closes vigorously due to strong restoring force of the coil spring and will break blank paper around the perforations of blank paper if the engagement between pin perforations of blank paper and pins of the belt is unstable. Also, there are cases where strong impact force takes place at the presser member when the latter was closed and finger tips are pinched by such strong impact force.

In view of the fact that most of the pin tractors as mentioned above have a presser member and a frame, both made of synthetic resin of high rigidity such as polycarbonate reinforced with glass fiber, the inventor has been led to conceive that such problems as mentioned above could be solved by dispensing with the coil spring by utilizing the elasticity of synthetic resin. However, it has been found that such a pin tractor with no coil spring raises new problems, for example, (1) the repetition of opening and closing of the presser member involves abrupt lowering of blank paper pressing force of the presser member, (2) abnormal sound offensive to the ear generates whenever the presser member is opened or closed, and so forth. On examination, it has been revealed that such problems are attributable to unsmooth sliding during the revolution of the presser member in relation to the frame but can be solved by good choice of materials.

As disclosed in U.S. Pat. No. 4,130,230 and No. 4,194,660, pin tractors were usually of such construction that the belts carrying pins are turned by a pair of driving and driven sprockets. However, with the spread of personal computers in recent years, printers, typewriters, etc. tend to be miniaturized and consequently compactification of pin tractors has been practised to turn and move a belt carrying pins as it is slid along a guide member provided at a tractor proper by the rotation of a driving sprocket (a driven sprocket is omitted) and thereby save the space of the tractor (for example, Japanese Utility Model Application Laying Open Gazette No. 57-135537).

However, in the pin tractor from which a driven sprocket has been omitted, such as mentioned above, a motor which is the power source of driving a driving sprocket is linked with the movement of a printing belt, driving of a platen roll, etc., for which high driving torque is required, but it is also required to miniaturize a motor to save space, for which a decrease of driving torque for the belt carrying pins is required. For this purpose, it has been practised to decrease the bending modulus of the belt by using a softer material for the belt carrying pins and to decrease the initial tension by lengthening the belt dimension to some extent. This, however, raises the problem of the lowering of paper feeding accuracy due to elongation of the belt or the problem of tooth skip on the driving pulley. A method of coating the guide surface of the frame with teflon having a low coefficient of friction, for example, is available but this involves wear of coating layer and higher manufacturing cost.

Furthermore, in the conventional pin tractor with a belt carrying pins which has a plurality of pins at a regular pitch on the surface of belt base and teeth at regular intervals on the back surface, it is required to engage the pins with feed perforations at both edges of blank paper being fed. Therefore, the belts carrying pins in pin tractors at both edges of blank paper must be turned synchronously, for which pins of the belts carrying pins of the pin tractors at both edges of blank paper must be positioned symmetrically. This requires attentiveness at the assembling process and stricter inspection at the inspecting process, in other words, composability is lowered.

In the light of the disadvantageous of the conventional pin tractor as mentioned above, in the pin tractors disclosed in U.S. Pat. No. 4,130,230 and U.S. Pat. No. 4,194,660 teeth of a driving sprocket are reduced by one piece or several pieces and teeth at the back side corresponding to the pins of a belt carrying pins are removed entirely and by engagement of both, positioning of the belt carrying pins is effected accurately and easily. However, under this arrangement the number of teeth of a driving sprocket which engage with the belt carrying pins is decreased and therefore turning torque which can be transmitted is reduced and in the case where the tension of the belt carrying pins is unsatisfactory, the problem of meandering of the belt will be raised.

SUMMARY OF THE INVENTION

The present invention has for its main object to decrease the number of parts of the pin tractor and thereby reduce the manufacturing cost and improve composability.

To attain the above object, in the pin tractor having a synthetic resin frame around which a belt carrying pins is wound revolvably and a synthetic resin presser member supported revolvably on said frame, wherein blank paper with feed perforations at its both edges is held between said frame and said presser member and said blank paper is sent forth with its feed perforations engaged with pins of the belt, the present invention is characterized in that said presser member has pawl parts and said frame has concaves to corespond to the pawl parts, whereby said concaves engage with said pawl parts elastically and said presser member is kept at the specified opened degree.

The other object of the present invention is to provide a pin tractor which does not produce abnormal sounds, prevents damage of blank paper at the time of changing blank paper and carries out accurate feeding of blank paper. For this purpose, in the pin tractor which utilizes elastic engagement of synthetic resin as mentioned above, the frame is made of resin having a coefficient of flexural elasticity of 10,000–80,000 $Kg/cm^2$ and the presser member is made of resin whose coefficient of friction in relation to the resin material of the frame is less than 0.2. However, the above values of the coefficient of flexural elasticity and the coefficient of friction are the values obtained at the temperature (−10° C.–50° C.) at which the pin tractor is used. The coefficient of friction includes both static one and kinetic one.

Another object of the present invention is to provide a pin tractor which can reduce driving torque for a belt carrying pins and can miniaturize a motor which is the power source. For this purpose, in the present invention a plurality of parallel bars are formed in the belt running direction at the guide part of the frame around which a belt carrying pins is wound.

Still another object of the present invention is to provide pin tractors, wherein positioning can be effected automatically by only engaging a belt carrying pins with a sprocket, without reducing transmittable turning torque to a large extent and without raising the problem of tooth skip, and wherein meandering movement of the belt carrying pins can be prevented by controlling the movement of the belt carrying pins in belt width direction. For this purpose, the teeth parts of the belt carrying pins are made in small tooth width at a regular ptich in circumferential direction and trough parts of the driving sprocket are formed so as to correspond to the teeth parts.

The foregoing and other objects of the present invention and novel features of the present invention will be more apparent from the following description made with reference to the accompanying drawings.

BRIEF DESCRIPTION OF THE DRAWINGS

The accompanying drawings show preferred embodiments of the present invention, in which.

DETAILED DESCRIPTION OF THE INVENTION

Figure 1:
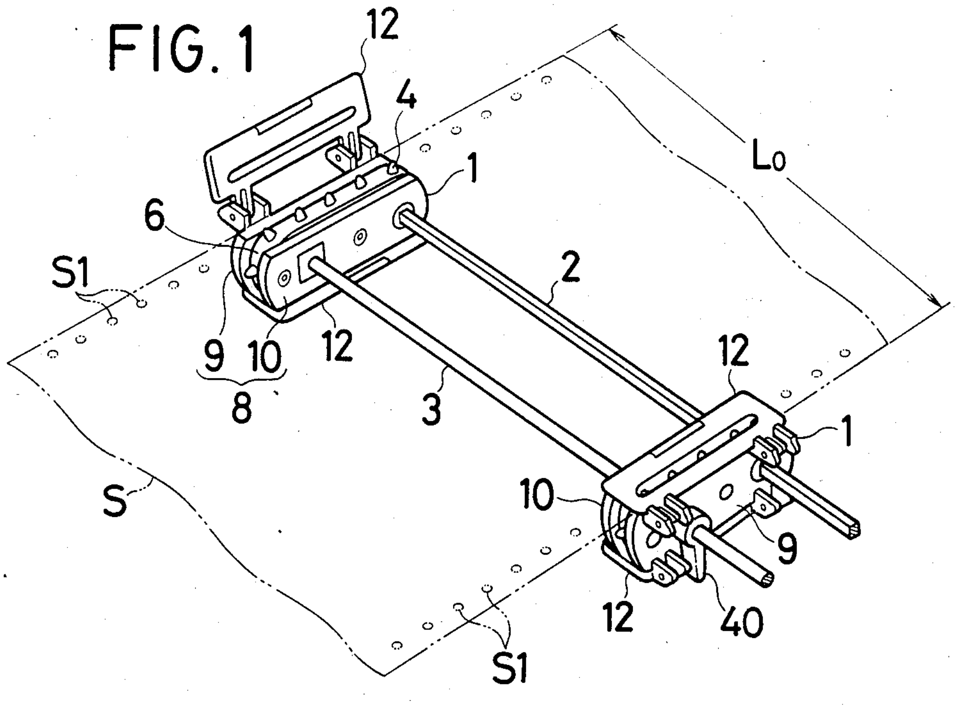
FIG. 1 is a perspective view of a blank paper feeding device using pin tractors.

In a blank paper feeding device shown in FIG. 1, numeral 1, denotes a pin tractor. These pin tractors 1 are arranged with a space corresponding to the width $L_o$ of blank paper S between them and are connected by a driving shaft 2, square in cross section, and a guide shaft 3, circular in cross section, which are substantially in parallel with each other.

Each pin tractor 1 has a belt 6 carrying pins, having a plurality of pins 4 engageable with feed perforations $S_1$ made at both edges of blank paper S and projecting from the surface of belt base at regular intervals and teeth 5 at the back side of the belt base. By the turning drive of the belt 6 carrying pins, the blank paper S is fed at a substantially uniform speed. The teeth part 5 of the belt 6 is linked with the driving shaft 2 and engages with a driving sprocket 7 which is fixed only in circumferential direction, whereby the belt 6 carrying pins is driven to turn.

Figure 2:
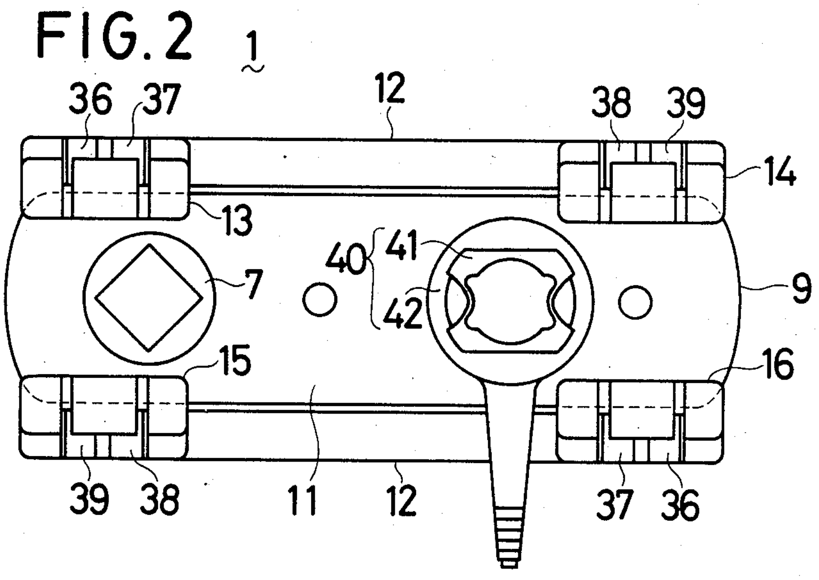
FiG. 2, FIG. 3 and FIG. 4 are a front view, a plan view and a side view, partly in section, respectively of the pin tractor.
Figure 3:
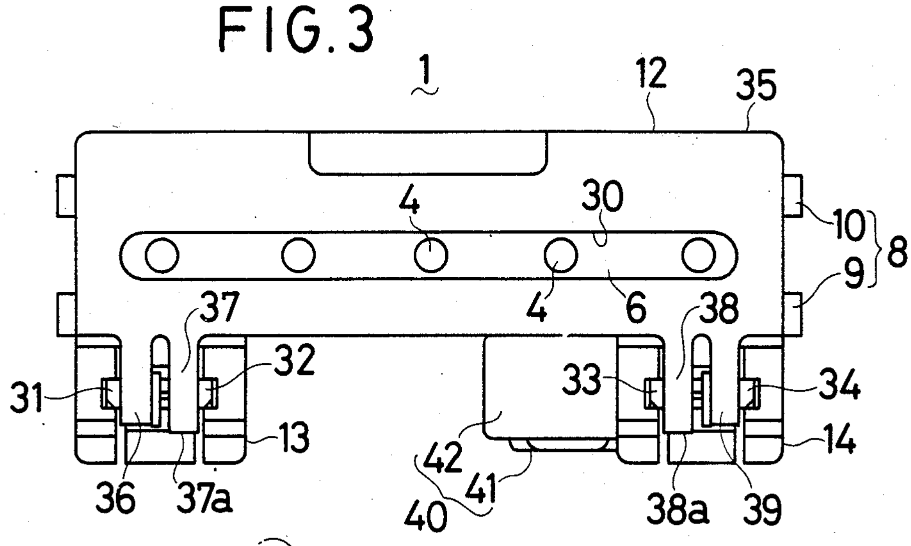
Figure 4:
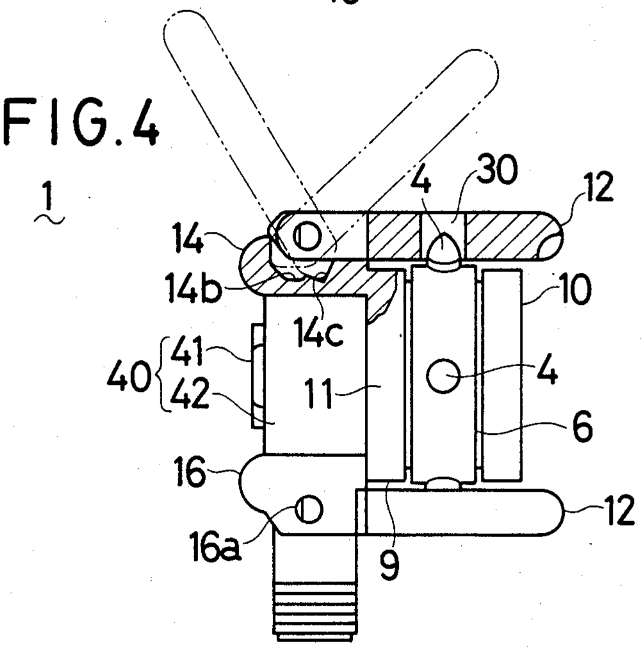

A frame 8 of the pin tractor 1 is made of synthetic resin and comprises a frame proper 9 and a guide frame 10 fixed in said frame proper 9, as shown in FIG. 2–FIG 4.

Figure 5:
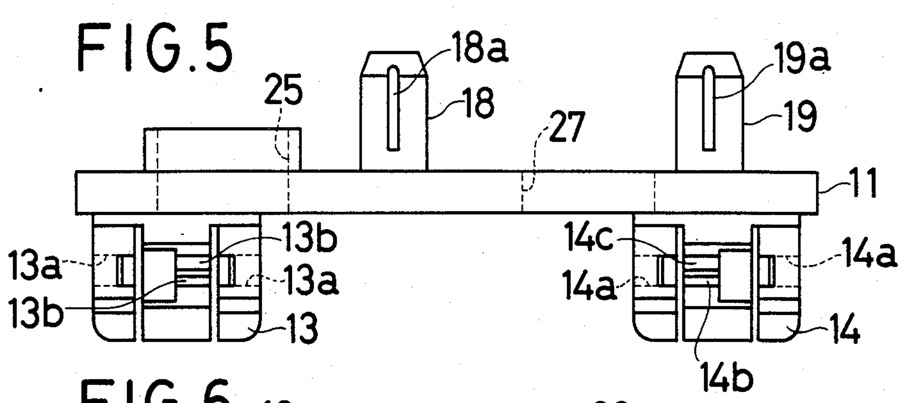
FIG. 5 is a plan view of the frame proper.

As shown in FIG. 2 and FIG. 5, the frame proper 9 has at one side thereof support parts 13, 14, 15, 16. There support parts are adapted to receive the axis parts 31, 32, 33, and 34 which extend from the arm parts 36, 37, 38, and 39 of the presser member 12. The axis parts 31, 32, 33, and 34 may be snap fit into the engaging holes **13*a*, 13*a*, '*14a*, 14*a* of the support parts 13 and 14. Thus the presser members 12 are rotatably engaged in the support parts 13 and 14**.

The frame 8 is constructed from the frame proper 9 and the guide frame 10 by engaging the engaging pins 18 and 19 with their respective spline grooves **18*a* and 19*a* of the proper frame 9, in the fitting holes 23 and 24 of the guide frames 10**.

Figure 6:
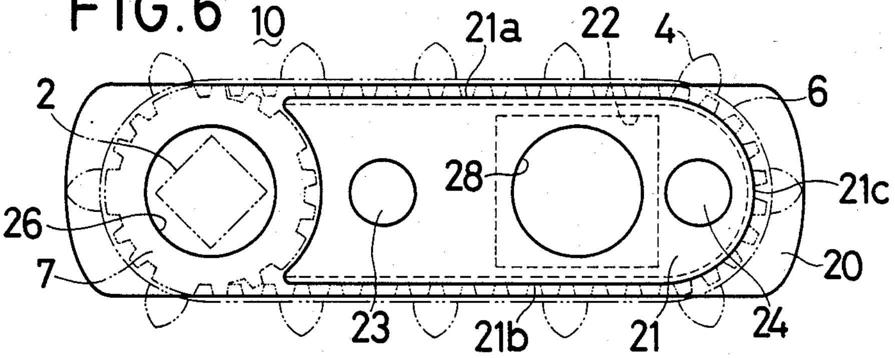
FIG. 6, FIG. 7 and FIG. 8 are a front view, a cross section and a side view respectively of the guide frame.
Figure 7:
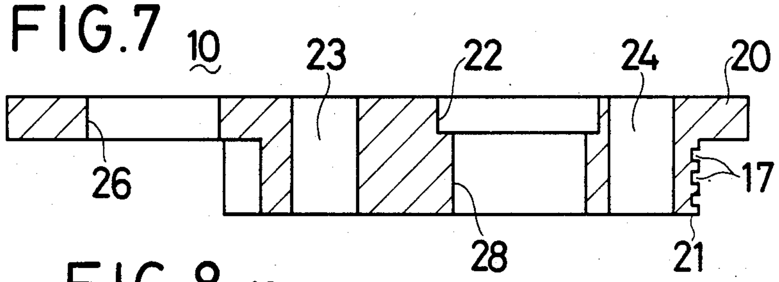
Figure 8:
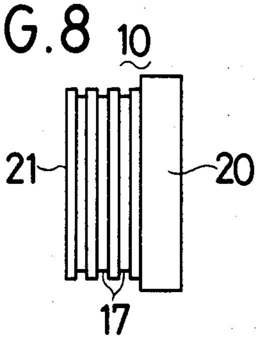

The guide frame 10, as shown in FIG. 6, FIG. 7 and FIG. 8, has at one side of a base plate part 20 a guide part 21 having a guide surface comprising two plane surfaces **21*a*, 21*b* and one curved surface 21*c* and at the other side thereof a concave part 22** in which a lock means (to be explained later) is fitted.

Fitting holes 23, 25 are made through the base plate part 20 of the guide frame 10 and the guide part 21. Engaging pins 18, 19 are fitted in said fitting holes 23, 24, whereby the frame proper 9 and the guide frame 10 are connected integrally, with the guide part 21 contacting the frame proper 9.

Provided at the guide surface (plane surfaces **21*a*, 21*b* and curved surface 21*c*) of the guide part 21 are a plurality of parallel grooves 17 which are along the belt running direction, whereby the contact area between the guide surface and teeth 5 of the belt 6** carrying pins is made less than 60% of that in the case of the whole surface contact.

Under the above arrangement, when the driving shaft 2 turns by turning of a driving motor (not shown in the drawing), teeth tips of teeth 5 of the belt 6 carrying pins slide on the guide surface (plane surfaces **21*a*, 21*b*** and curved surface 21*c*) of the guide part 21 but since the guide part 21 has parallel grooves 17 and the contact area is smaller, smaller driving torque for the belt 6 by carrying pins will suffice and consequently a driving motor which is the power source can be miniaturized. If the cross sectional shape of teeth 5 is made simicircular, the contact area will become still smaller, for which still smaller driving torque will suffice.

The driving sprocket 7 which is fitted to the driving shaft 2 and turns integrally with the latter is supported rotatably by the hole 25 of the frame proper 9 and the hole 26 of the guide frame 10. The guide shaft 3 is put slidably through the holes 27, 28 of both frames 9, 10 through the medium of a lock means 40.

Figure 9:
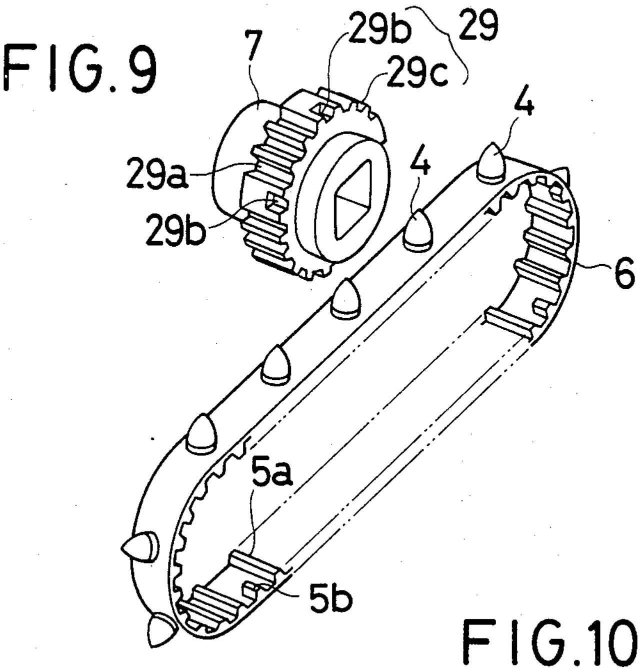
FIG. 9 is a perspective view showing the relation between a belt carrying pins and a driving sprocket.

As shown in FIG. 9, the belt 6 carrying pins have the teeth 5 comprising teeth 5*a* extending the whole width of the belt base and different teeth 5*b* which are located at one side of the belt base and have the width which is less than 50% of that of the teeth 5*a*. Teeth 5*b* are arranged at a regular pitch between the teeth 5*a*. Trough parts 29 of the driving sprocket 7 are formed to correspond to the teeth part, namely, trough parts 29*a* which are longer in axial direction and short troughs 29*b*.

Under the above arrangement, by only engaging the belt 6 carrying pins with the driving sprocket 7, the positional relation between the pins 4 of the belt 6 carrying pins and the driving shaft 2 through the engagement of teeth 5*b* of narrow width with the corresponding trough parts 29*b* of the driving sprocket 7 is determined and accordingly positioning of pins 4 of the belts 6 carrying pins in the pin tractors located at both edges of the blank paper S is effected automatically and thus both belts 6 carrying pins turn synchronously, with the pins of the belts 6 at both edges of the blank paper positioned symmetrically.

As the teeth 29*b* of narrow width are positioned at the edge of one side of the belt base in the belt 6 carrying pins, movement of the belt 6 carrying pins in belt width direction in relation to the driving sprocket 7 is controlled and therefore the meandering of the belt 6 carrying pins is prevented and also the fitting direction of the belt 6 carrying pins is made uniform. Thus, some irregularity elements in manufacturing to be caused by the difference in fitting direction can be eliminated.

Figure 10:
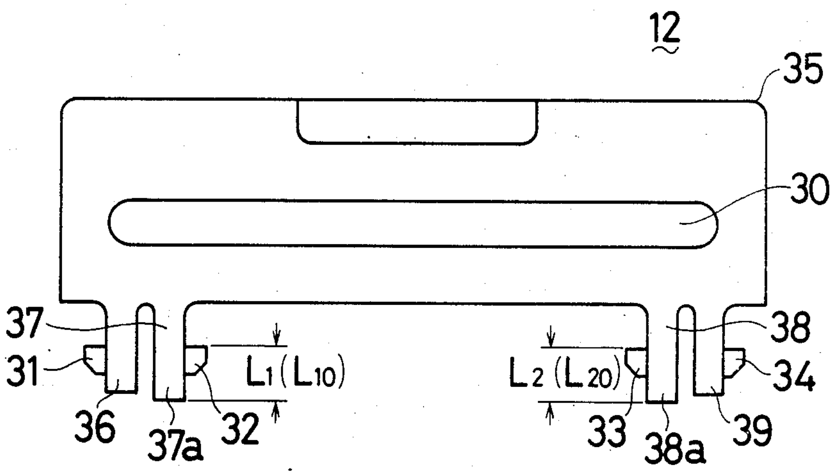
FIG. 10 is a plan view of a presser member.
Figure 11:
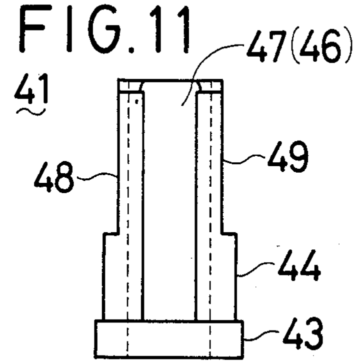
FIG. 11 and FIG. 12 are a side view and a plan view, partly in section, respectively of a fixing member.
Figure 13:
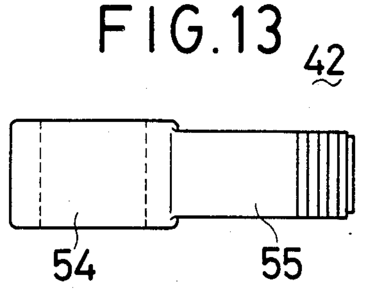
FIG. 13 and FIG. 14 are a plan view and a side view respectively of a lever member.
Figure 12:
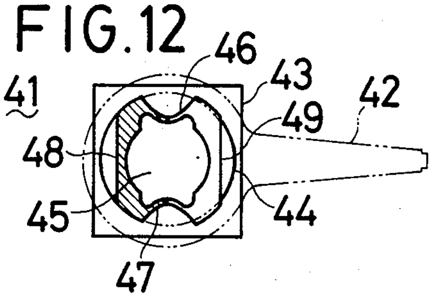
Figure 14:
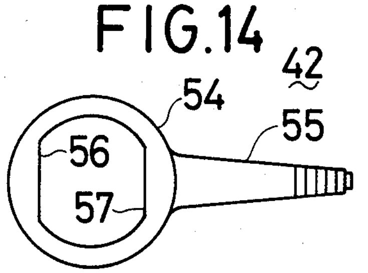

As shown in FIG. 10, the presser member 12 has a slit 30 made at the position corresponding to the moving path of the belt 6 carrying pins and also axis parts 31, 32, 33, 34 which engage with engaging holes 13*a*, 14*a* of the support parts 13, 14 (or 15, 16) of the frame proper 9. Axis parts 32, 32, 33, 34 are projected from arm parts 36, 37, 38, 39 respectively which protrude from a base plate 35 in the same direction. Arm parts 37, 38 at the inner side are longer than arm parts 36, 39 at the outer side and top parts (pawl parts) 37*a*, 38*a* of the former engage elastically with concaves 13*b*, 13*c*, 14*b*, 14*c* of the support parts 13, 14 (or 15, 16) and hold the presser member 12 at the specified opened degree. The axis parts 31, 33 and the axis parts 32, 34 project in opposite direction respectively.

The lock means 40 which fixes the pin tractor 1 to the guide shaft 3 has a tubular fixing member 41 fitted to the guide shaft provided at the frame proper 9 and a lever member 42 fitted movably to said fixing member 41.

The fixing member 41 carries a rectangular base part 43 and a tubular part 44 connected to said base part 43. A hole 45 through which the guide shaft 3 is put is made through the base part 43 and the tubular part 44. The tubular part 44 is provided with flat surfaces 46, 47, back to back, in axial direction and thin parts 48, 49 which are transformable inwardly are formed at the position about 90° shifted in circumferential direction from the flat surfaces 46, 47.

A lever member 42 comprises a tubular part 54 having an inside diameter which is substantially the same as the outside diameter of the tubular part 44 and a lever part 55 which is connected to the tubular part 54 and extends in radial direction. Provided at the inner peripheral surface of the tubular part 54 are control surfaces 56, 57 which make the inside diameter smaller.

In the lock means 40 composed as above, when the lever member 42 revolves in one direction and the control surfaces 56, 57 disengage from the flat surfaces 46, 47 of the tubular part 54 in the fixing member 41 and ride on the circumferential surface, the tubular part 54 deforms in such a fashion that it makes the inside diameter of the hole 45 smaller and consequently tightens the guide shaft 3, whereupon the pin tractor 1 is fixed immovably in relation to the guide shaft 3. At this time, thin parts 48, 49 transform in such a fashion that they project inwardly in radial direction and are pressed by the guide shaft 3. If many ruggednesses extending in axial direction are formed at the inner surface of the hole 45, it improves tightening force.

In the above fixed condition of the pin tractor 1, if the lever member 42 is revolved in one direction and the control surfaces 56, 57 are engaged with the flat surfaces 46, 47 of the tubular part 54, fixing of the pin tractor 1 to the guide shaft 3 is released and accordingly the pin tractor 1 is made movable along the guide shaft 3.

The guide frame 10 is made of oleo-engineering plastics which is engineering plastics, such as polycarbonate, polybutadieneterephthalate, polyacetal, polyamide, etc., mixed with 5–30% in weight of lubricating oil. The driving sprocket 7 is also made of such material.

Under the above composition, the axis parts 31, 32, 33, 34 can easily be engaged with the engaging holes 13*a*, 13*a*, '*14a*, 14*a* by making the arm parts 36, 37 and the arm parts 38, 39 transform elastically in such a fashion that they approach each other, in other words, the presser member 12 can be fitted to the frame proper 9 (the frame 8) by one touch.

In the above fitted condition, if the presser member 12 is revolved, the arm parts 37, 38 transform elastically according to the degree of revolving angle of the presser member 12 and the top parts 37*a*, 38*a* of the arm parts 37, 38 are fitted elastically in the concaves 13*b*, 14*b* or 13*c*, 14*c* of the support parts 13, 14. As a result, the presser member 12 is held in the specified opened degree and in this condition spring force does not act on the presser member 12 (refer to chain lines in FIG. 4).

In the closed condition of the presser member 12, top parts 37*a*, 38*a* of the arm parts 37, 38 of the presser member 12 are in such state that they push upper ends 14*d* (13*d*) of the support parts 13, 14 and as a result, flexural elasticity force generates around the upper ends of the support parts 13, 14 of the frame proper 9. This force becomes the blank paper pressing force of the presser member 12. It is so designed that the blank paper pressing force generates when the presser member 12 is opened at the angle of about 20° from the entirely closed condition. When the change of blank paper is finished and the presser member 12 is put in the original condition (in closed condition), the presser member 12 is not closed vigorously as in the case of the conventional pin tractor using a coil spring and therefore there is no danger of breaking blank paper S around the feed perforations $S_1$ and the pin tractor 1 can be handled easily.

For obtaining the proper blank paper pressing force, it is required that the shape and dimensions of the top ends 37*a*, 38*a* of the arm parts 37, 38 in the pressing member 12 and the support parts 13, 14, 15 of the frame proper 9 are proper. It is also required to satisfy the following qualitative requirements.

Figure 15:
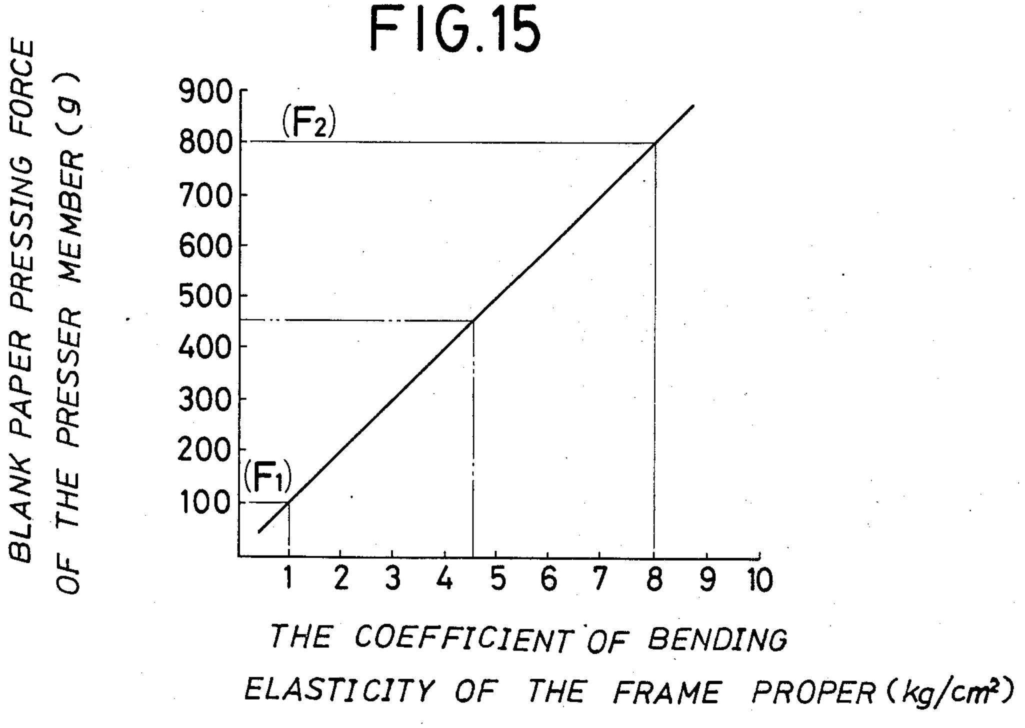
FIG. 15 is a graphic which shows a relation between the coefficient of bending elasticity of the frame proper and blank paper pressing force of the presser member.
Figure 16:
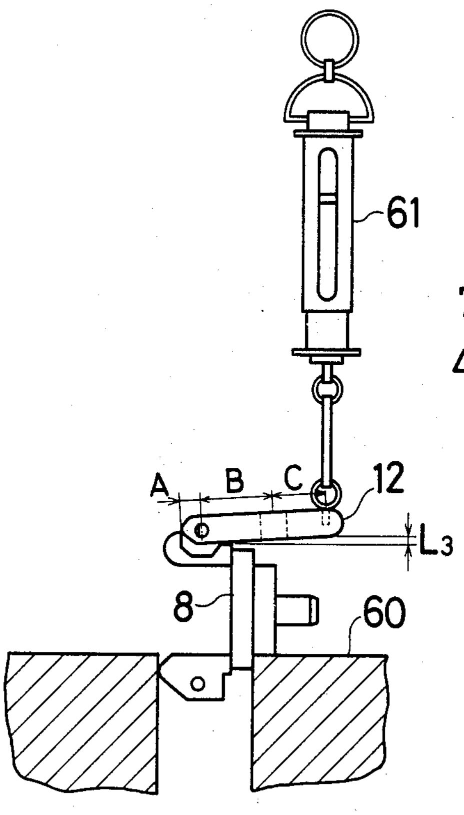
FIG. 16 is an explanatory drawing of the method of measuring the blank paper pressing force.

(1) The flexural elasticity force of the frame proper 9 is the source of blank paper pressing force. As can be seen from FIG. 15 which shows the relation between the coefficient of bending elasticity of the material of the frame proper 9 and the blank paper pressing force of the presser member 12, when the blank paper pressing force becomes less than the lowest limit value $F_1$, blank paper comes off the pins of the belt carrying pins during

37*a*, 38*a* of the arm parts 37, 38 wear, pressing of the top ends 13*d*, 14*d* of the support parts (13, 14 for example) of the frame proper 9 by the top ends 37*a*, 38*a* decreases and as a result, blank paper pressing force decreases and feed perforations of the blank paper S come off the pins 4 of the belt 6 carrying pins. Rigidity of the presser member 12 need not to be so high as in the case of the conventional pin tractor using a coil spring. However, the presser member 12 should have rigidity to such an extent that when the top ends 37*a*, 38*a* of the arm parts 37, 38 of the presser member 12 press the upper ends 13*d*, 14*d* of the support parts (13, 14, for example), the presser member 12 is neither deformed nor damaged by the force applied to it.

Explanation is made below about the test carried out using concrete material for the presser member 12 and the frame proper 9.

| Frame proper (A material) | Presser member (B material) | Coefficient of bending elasticity of A material | Coefficient of friction (μ) (A material/ B material) | Result 1 | Result 2 | Result 3 |
|---|---|---|---|---|---|---|
| | | Examples of the present invention | | | | |
| PC-GF 10% | PC-PTFE 10% | 35,000 Kg/cm$^2$ | 0.10 | 350 g | 250 g | −0.05 mm |
| PAR-GF 15% | PAR-PTFE 5% | 40,000 Kg/cm$^2$ | 0.09 | 380 g | 270 g | −0.03 mm |
| | | Comparative examples | | | | |
| PC-GF 10% | PC-GF 10% | 35,000 Kg/cm$^2$ | 0.30 | 350 g | 20 g | −0.18 mm |
| POM-GB 25% | POM-GB 25% | 35,000 Kg/cm$^2$ | 0.25 | 350 g | X | X |
| PC-PTFE 10% | PC-GF 10% | 23,000 Kg/cm$^2$ | 0.10 | 270 g | 190 g | −0.02 mm |
| PBT-40% flake | PC-GF 10% | 83,000 Kg/cm$^2$ | 0.35 | 800 g | 90 g | −0.18 mm |

Abbreviations of materials in the above table are explained below.
(1) PC-GF 10%: Polycarbonate compounded with glass fiber reinforcing agent 10% (Upilon GS 2010 M made by Mitsubishi Gas Chemistry)
(2) PC-PTFE 10%: Polycarbonate compounded with polytetraphloroethylene 10% (Upilon LS 2010 made by Mitsubishi Gas Chemistry)
(3) PAR-GF 15%: Polyacrylate compounded with glass fiber reinforcing agent 10% (u - polymer A × G 1500 - made by Unitika)
(4) PAR-PTFE 5%: Polyacrylate compounded with polytetraphloroethylene 5% (u - polymer - UF 100 made by Unitika)
(5) POM-GB 25%: Polyacetal compounded with glass beads reinforcing agent 25%
(6) PBT-40% flake: Polybutylenterephthalate compounded with reinforcing agent 40% (Duranex 7400 W made by Polyplastic)

the running of the tractor. On the other hand, when the blank paper pressing force becomes more than the least upper bound value $F_2$, possibility of breaking blank paper around the perforations in changing blank paper increases and change of blank paper becomes difficult. Therefore, it is required that the coefficient of bending elasticity of the frame proper 9 is within the range of 10,000–80,000 Kg/cm$^2$, preferably within the range of 20,000–45,000 Kg/cm$^2$.

(2) As the top ends 37*a*, 38*a* of the arm parts 37, 38 of the presser member 12 slide strongly in relation to the support parts (13, 14, for example) of the frame proper 9 when the presser member 12 opens and closes, the presser member 12 must be made of material having high slidability, namely, the coefficient of friction of the presser member 12 to the frame proper 9 must be less than 0.2. If the coefficient of friction is 0.2 or more, abnormal sound offensive to the ear generates when the presser member 12 opens and closes, as suggested by the comparative examples to be given later. Moreover, sliding friction between the top ends 37*a*, 38*a* of the arm parts 37, 38 of the presser member 12 and the support parts (13, 14, for example) of the frame proper 9 increases and consequently wear of the top ends 37*a*, 38*a* of the arm parts 37, 38 is accelerated. If the top ends The coefficient of bending elasticity in the above table was measured at the room temperature (23° C.) on the basis of AST MD-790. The coefficient of friction (μ) was measured at the room temperature (23° C.) for the coefficient of static friction, on the basis of ASTMD-1894.

The Result 1 shows the blank paper pressing force at the initial stage, namely, before the test is carried out. The blank paper pressing force at the time when the presser member 12 was opened to the degree of $L_3$ (about 1 mm), with the frame 8 fitted to a clamp table 60, was measured while a spring balance 61 was being lifted slowly. Measurements of A, B and C are 4.0 mm, 12.5 mm and 11.0 mm respectively.

The Result 2 shows the blank paper pressing force measured after the presser member 12 was opened and closed 20,000 times.

The Result 3 shows the amount of wear of the top ends 37*a*, 38*a* (pawl parts) of the arm parts 37, 38 measured after the presser member 12 was opened and closed 20,000 times, namely, measurements $L_1$, $L_2$ after 20,000 times opening and closing deducted by measurements $L_{10}$, $L_{20}$ at the initial stage in FIG. 10. Measuring was made by using a projector equipped with a length measuring device (NIKON PROFILE PROJECTOR V-12 made by Nippon Kogaku K.K.).

X mark shows that the opening and closing test was stopped due to excessive generation of abnormal sound.

The embodiments of the present invention described above refer to a pin tractor with a belt carrying pins wound between a driving sprocket and a guide part (frame) but are applicable to a different pin tractor with a belt carrying pins would between a driving sprocket and a driven sprocket.

Figure 17:
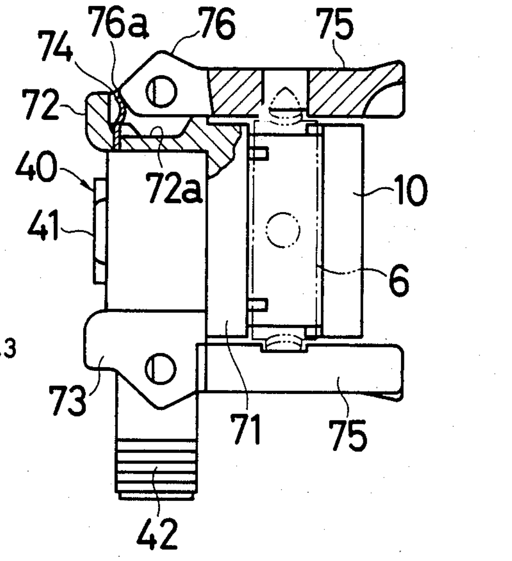
FIG. 17 is a drawing similar to FIG. 4, regarding an example of modification.
Figure 18:
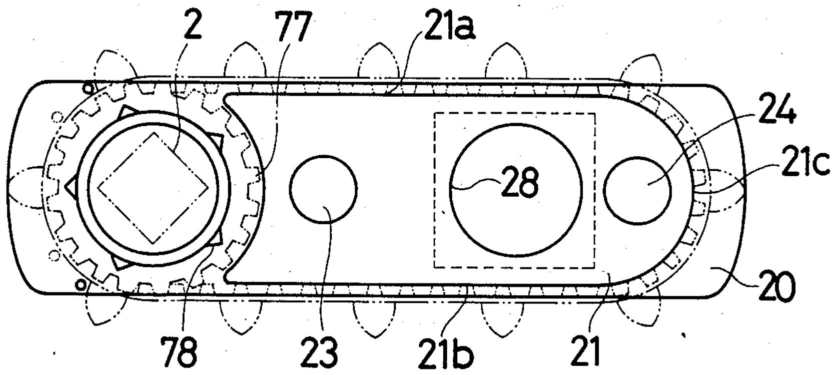
FIG. 18 is a drawing similar to FIG. 6, regarding an example of modification.

In the above embodiments, the presser member 12 is kept opened in the specified degree by elastic fitting between the support parts 13, 14 (or 15, 16) of the frame proper 9 and the presser member 12 but it is possible to keep a presser member 75 opened in the specified degree by providing a leaf spring 74 at a concave (only 72*a* is shown) of a support part (only 72, 73 are shown) of a frame proper 71 and by fitting elastically a top end 76*a* of an arm part 76 of a presser member 75 in said concave, as shown in FIG. 17. In this example, a driving sprocket 77 has marks for positioning of pins.

As the present invention can be embodied in various types without departing from its substantial characteristics, the above embodiments have been given solely for explanation purposes and are not of restrictive nature. Furthermore, as the scope of the present invention is not limited by the description made preceding the claim but is limited by the scope of claim for patent, any change in the requirements of the scope of claim for patent and equivalents to such requirements are included in the scope of claim for patent.

What is claimed is:

1. A pin tractor including a first frame portion, a second frame portion, said first and second frame portions forming a frame, at least one presser member, said frame portions and said presser member comprising a synthetic resin, one said frame portion having at least one support part adapted to rotatably support said at least one presser member, said frame adapted to rotatably support an endless belt, said belt including pins adapted to engage openings in paper, said presser member including a slot, said presser member with said slot adapted to hold said paper between said presser member and said frame, said slot further adapted to receive said pins moving therethrough without obstruction, said at least one presser member including at least one pair of arms, at least one of said pair of arms adapted to act as a pawl, each said arm including a pivot, said at least one support part including openings adapted to rotatably receive said pivots, said at least one support part including at least one concavity adapted to resiliently hold said pawl.

2. A pin tractor as defined in claim 1, wherein at least said first frame portion is made of resin material, whose coefficient of bending elasticity is within the range of 10,000–80,000 $Kg/cm^2$ and said presser member is made of resin material whose coefficient of friction to the resin material of said frame is 0.2 or less.

3. A pin tractor as defined in claim 2, wherein at least said first frame portion is made of resin material, whose coefficient of bending elasticity is within the range of 20,000–45,000 $Kg/cm^2$.

4. A pin tractor as defined in claims 1, 2 or 3 including a guide part on one end of one of said frame portions, said guide part including a plurality of grooves along the plane of movement of said belt, said belt including inner teeth, a drive sprocket, said drive sprocket at the other end of one of said frame portions, said sprocket adapted to drive said belt.

5. A pin tractor as defined in claim 4 wherein said guide part is made of oleo-synthetic resin.

6. A pin tractor as defined in claim 1 wherein said belt teeth engagable with said sprocket are narrow in width at a uniform pitch in circumferential direction and trough parts of said driving sprocket being so formed as to correspond to said teeth parts.

* * * * *